US006438633B1

(12) United States Patent
Stone

(10) Patent No.: US 6,438,633 B1
(45) Date of Patent: Aug. 20, 2002

(54) SYSTEM FOR PROVIDING DETERMINISTIC PERFORMANCE FROM A NON-DETERMINISTIC DEVICE

(75) Inventor: Glen D. Stone, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/553,304

(22) Filed: Apr. 20, 2000

(51) Int. Cl.[7] .............................................. G06F 13/00
(52) U.S. Cl. ...................................... 710/107; 709/226
(58) Field of Search ................................. 710/100, 126, 710/129, 113, 305, 107; 370/463; 709/200, 223, 225, 226, 232

(56) References Cited

U.S. PATENT DOCUMENTS 5,953,511 A * 9/1999 Sescila, III et al. .......... 710/129
6,115,770 A * 9/2000 Gehman ..................... 710/128
6,169,745 B1 * 1/2001 Liu et al. .................... 370/463
6,243,778 B1 * 6/2001 Fung et al. .................. 710/113

* cited by examiner

*Primary Examiner*—Glenn A. Auve
(74) *Attorney, Agent, or Firm*—Gregory J. Koerner; Simon & Koerner LLP

(57) ABSTRACT

A system for providing deterministic performance from a non-deterministic device comprises one or more nodes that perform isochronous and/or non-isochronous data transfer operations onto an input/output bus of an electronic device. A bandwidth manager preferably programs a deterministic interface with a maximum data value that is selected to prevent non-isochronous conflicts for control of the input/output bus to thereby permit successfully execution of deterministically-scheduled isochronous data transfers. The deterministic interface preferably may interrupt a non-isochronous data transfer operation whenever a data-unit total from transferred data equals the corresponding programmed maximum data value. An interrupted node may then attempt to complete the non-isochronous data transfer operation in subsequent isochronous cycles.

43 Claims, 9 Drawing Sheets

SYSTEM FOR PROVIDING DETERMINISTIC PERFORMANCE FROM A NON-DETERMINISTIC DEVICE

CROSS-REFERENCE TO RELATED APPLICATION

This application is related to co-pending U.S. patent application Ser. No. 09/383,490, entitled "System And Method For Effectively Performing Isochronous Data Transfers," filed on Aug. 26, 1999, which is hereby incorporated by reference. These related applications are commonly assigned.

BACKGROUND SECTION

1. Field of the Invention

This invention relates generally to techniques for performing data transfer operations, and relates more particularly to a system for providing deterministic performance from a non-deterministic device.

2. Description of the Background Art

Implementing effective methods for transferring data between electronic devices is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing data transfer operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Network size is also a factor that affects the management of data transfer operations in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to transfer data to and from various remote devices across the electronic network. However, successfully managing a substantial number of electronic devices across a single network may provide significant benefits to a system user.

Furthermore, enhanced device capability to perform various advanced memory transfer operations may provide additional benefits to a system user, but may also place increased demands on the control and management of the various devices in the electronic network. For example, an enhanced electronic network that effectively accesses, processes, and displays digital television programming may benefit from efficient network communication techniques because of the large amount and complexity of the digital data involved.

One type of data transfer that may occur in an electronic network is an isochronous data transfer. Isochronous data transfers include the guaranteed handling of data that arrives in a time-based stream at regular intervals called cycles. Isochronous data transfers are typically used for time-sensitive applications. For example, video or audio data being transmitted across a network typically needs to arrive at a display device in an uninterrupted flow with appropriate timing.

Due to growing demands on system resources and substantially increasing data magnitudes, it is apparent that developing new and effective methods for transferring data is a matter of significant concern for the related electronic technologies. Therefore, for all the foregoing reasons, implementing effective methods for transferring data between electronic devices remains a significant consideration for designers, manufacturers, and users of contemporary electronic devices.

SUMMARY

In accordance with the present invention, a system is disclosed for providing deterministic performance from a non-deterministic device. In one embodiment, one or more nodes are configured to perform isochronous and/or non-isochronous data transfer operations onto an input/output bus of an electronic device. Initially, a bandwidth manager preferably programs a maximum data register with a maximum data value that specifies a maximum number of data units to be transferred from a corresponding node during a single isochronous cycle. The electronic device then preferably waits for a cycle start signal to indicate the beginning of the next isochronous cycle. The electronic device next preferably waits for a request for access to the input/output bus from a particular node.

After a request for the input/output bus occurs, then the requesting node preferably waits to receive a grant signal from an input/output bus bridge contained in the electronic device authorizing the requesting node to take control of the input/output bus. After a grant signal is received by the requesting node, then that node preferably begins to transfer data units through a deterministic interface onto the input/output bus. A data counter preferably monitors the number of data units as they are transferred, and stores the number of transferred data units as a data count value in the deterministic interface.

A comparator preferably then determines whether the current data count value in the data counter is equal to the maximum data value in the maximum data register. If the current data count value in the data counter is equal to the maximum data value in the maximum data register, then, control logic in the deterministic interface preferably commands the transferring node to interrupt the current non-isochronous data transfer. The deterministic interface also preferably resets the data count value in the data counter to a value of zero.

If untransferred data remains in the interrupted non-isochronous data transfer operation, then the electronic device preferably waits for a new cycle start signal to indication the beginning of the next isochronous cycle. After a new cycle start occurs, then interrupted node may attempt to complete the non-isochronous data transfer operation in the new isochronous cycle and in subsequent isochronous cycles. The present invention thus effectively implements a system and method for providing deterministic performance from a non-deterministic device.

DETAILED DESCRIPTION

The present invention relates to an improvement in electronic devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system for providing deterministic performance from a non-deterministic device, and includes one or more nodes which perform isochronous and/or non-isochronous data transfer operations onto an input/output bus of an electronic device. A bandwidth manager preferably programs a deterministic interface with a maximum data value that is selected to prevent non-isochronous conflicts for control of the input/output bus to thereby permit successfully execution of deterministically-scheduled isochronous data transfers. The deterministic interface preferably may interrupt a non-isochronous data transfer operation whenever a data-unit total from transferred data equals the corresponding programmed maximum data value. An interrupted node may then attempt to complete the non-isochronous data transfer operation in subsequent isochronous cycles.

Figure 1:
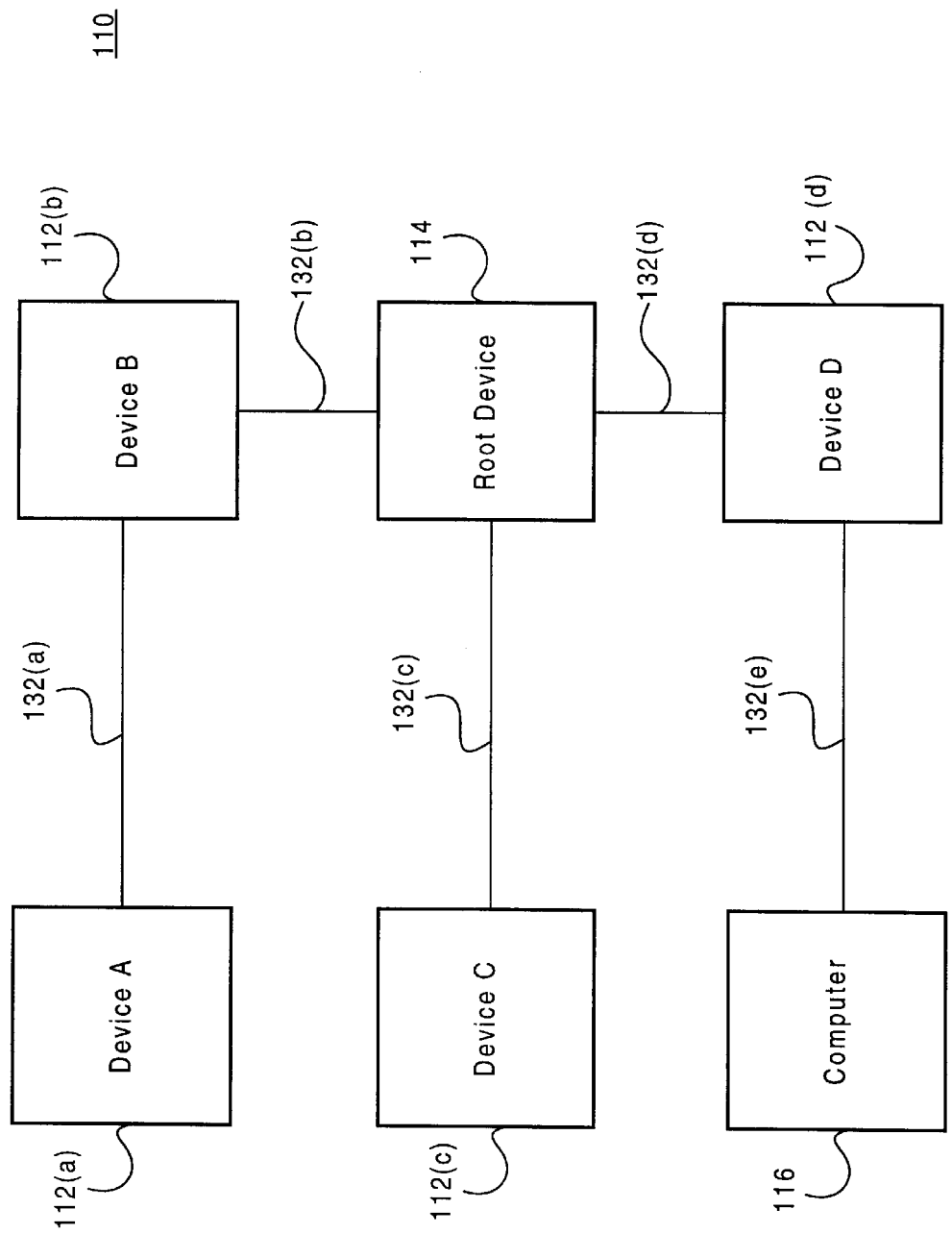
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices (device A 112(a), device B 112(b), device C 112(c), device D 112(d), and device E 112(e)), and computer 116. In alternate embodiments, electronic network 110 may readily be configured to include various other devices or components in addition to, or instead of, those discussed in conjunction with the FIG. 1 embodiment. In alternate embodiments, network 110 may readily be connected and configured in any other appropriate and suitable manner.

In the FIG. 1 embodiment, devices 112 and computer 116 of network 110 may alternately be implemented as any type of electronic device, including, but not limited to, personal computers, printers, digital video disc devices, television sets, audio systems, video cassette recorders, and set-top boxes for digital broadcasting. In the FIG. 1 embodiment, devices 112 and computer 116 preferably communicate with one another using a network bus 132. Network bus 132 preferably includes path 132(a), path 132(b), path 132(c), path 132(d), and path 132(e). For example, device B 112(b) is coupled to device A 112(a) via path 132(a), and to root device 114 via path 132(b). Similarly, device E (112(e) is coupled to device C 112(c) via path 132(c), and to device D 112(d) via path 132(d). In addition, device D 112(d) is coupled to computer 116 via path 132(e). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies which are equally within the scope of the present invention.

In the FIG. 1 embodiment, certain devices 112 and/or computer 116 in electronic network 110 may communicate with other devices 112 and/or computer 116 within network 110. For example, computer 116 may communicate with device B 112(b) by transmitting transfer data via cable 132(e) to device D 112(d), which may then transmit the transfer data via cable 132(d) to device E (112(e). In response, device E 112(e) then may transmit the transfer data to device B 112(b) via cable 132(b).

Figure 2:
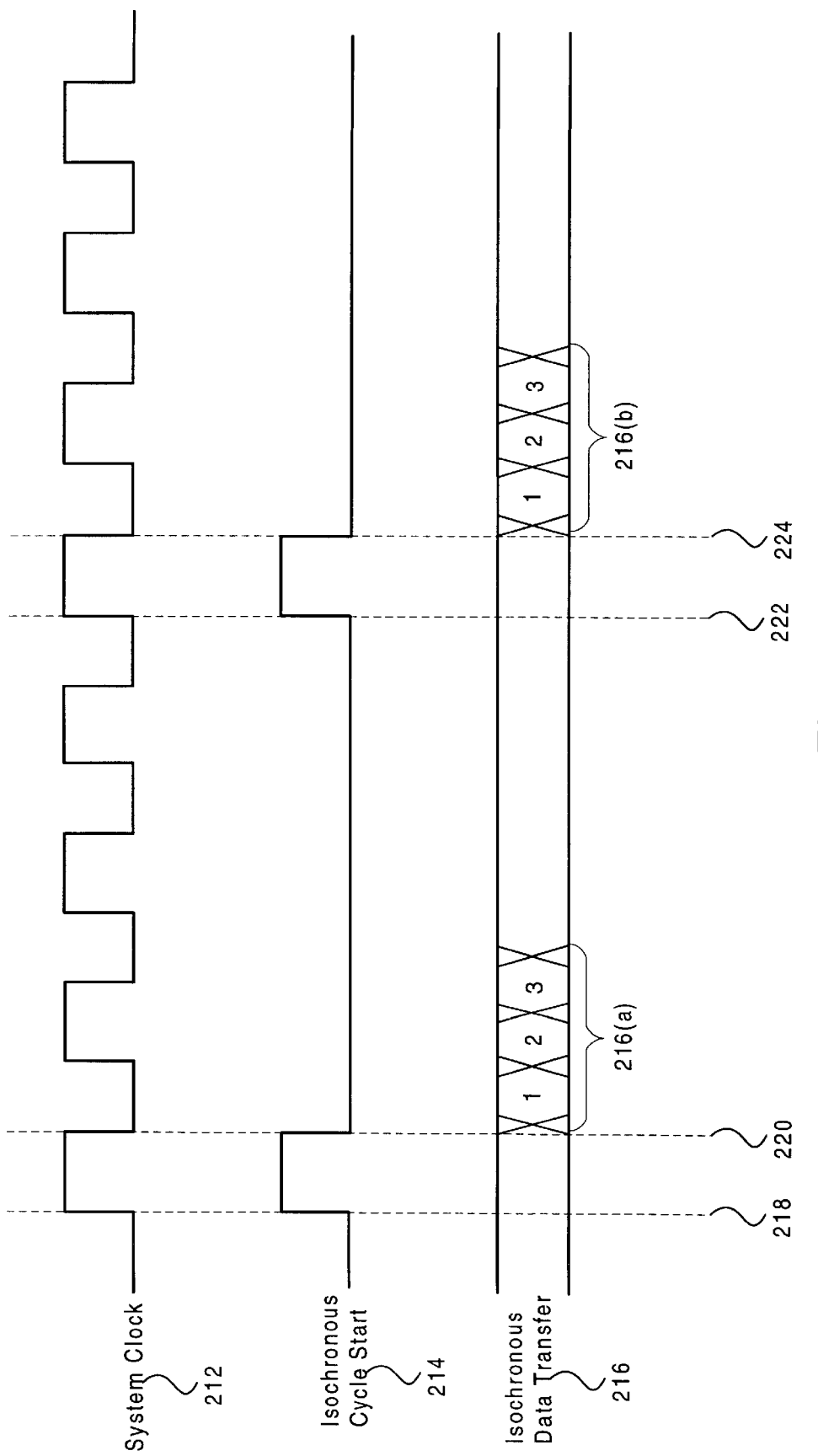
FIG. 2 is a timing diagram for one embodiment of exemplary isochronous data transfers, in accordance with the present invention.

Referring now to FIG. 2, a timing diagram for one embodiment of exemplary isochronous data transfers is shown, in accordance with one embodiment of the present invention. The FIG. 2 timing diagram includes a system clock 212, an isochronous cycle start signal 214, and an isochronous data transfer signal 216. In FIG. 2, at time 218, a first isochronous cycle start pulse changes state in synchronization with system clock 212. At time 220, the isochronous cycle start pulse changes state again, and isochronous data transfer 216(a) responsively occurs in a deterministic manner.

Similarly, at time 222, a second isochronous cycle start pulse changes state in synchronization with system clock 212. At time 224, the second isochronous cycle start pulse once more changes state, and isochronous data transfer 216(b) again occurs in a deterministic manner. Therefore, as illustrated in FIG. 2, isochronous data transfers 216(a) and 216(b) typically occur at a pre-determined time and frequency in network 110. Furthermore, network 110 may cause isochronous data transfers 216(a) and 216(b) to occur before any asynchronous data transfers because of the time-sensitive nature of isochronous data.

Figure 3:
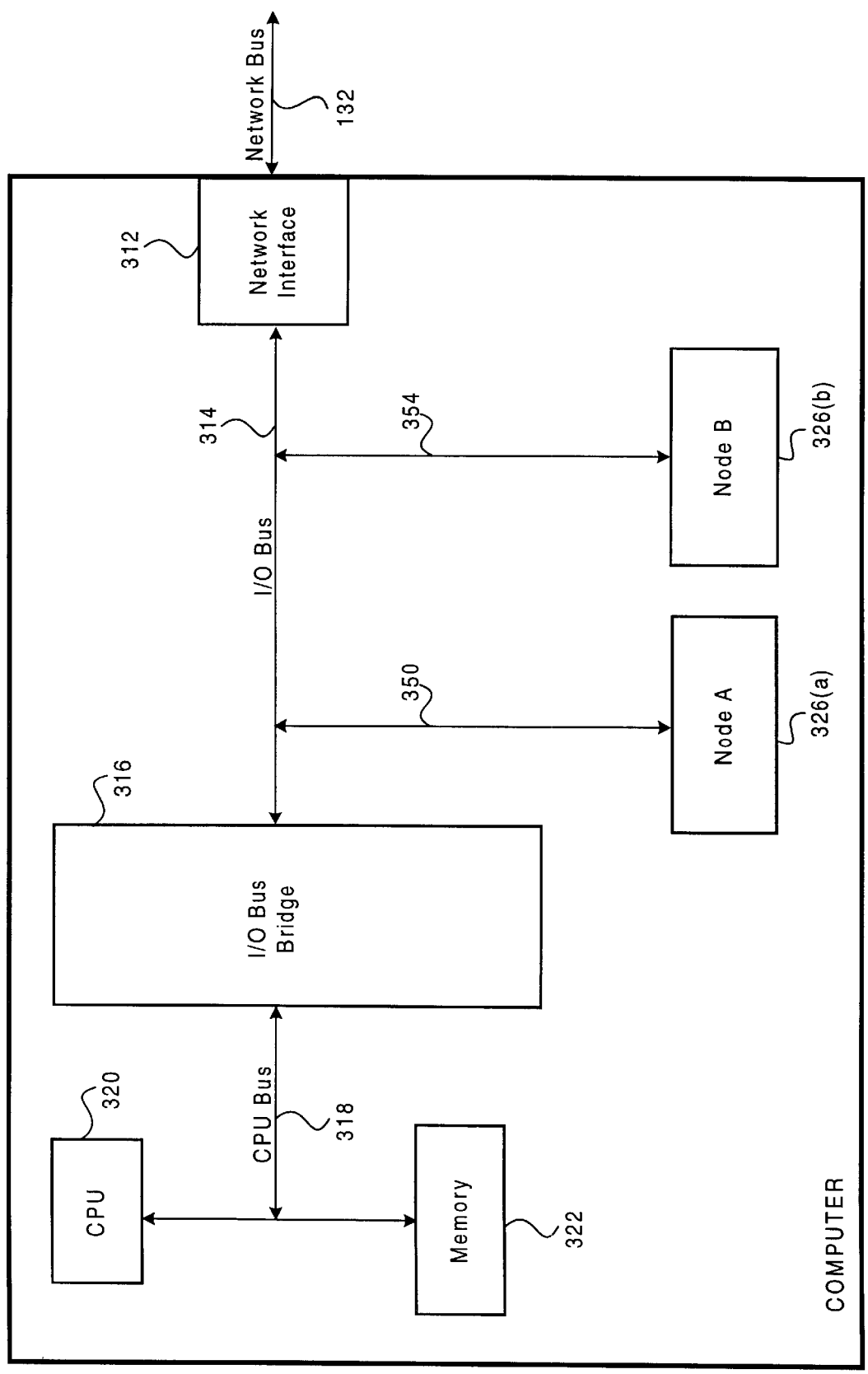
FIG. 3 is a block diagram for one embodiment of the computer shown in FIG. 1.

Referring now to FIG. 3, a block diagram for one embodiment of the FIG. 1 computer 116 is shown. In the FIG. 3 embodiment, computer 116 preferably includes an input/output (I/O) bus 314 for transferring various types of information and data to or from computer 116. In the FIG. 3 embodiment, I/O bus 314 is preferably implemented according to a Peripheral Component Interconnect (PCI) bus specification that is further described in "PCI Local Bus Specification," Revision 2.1s, 1995, PCI Special Interest Group, which is hereby incorporated by reference. However, in alternate embodiments, I/O bus 314 may be implemented according to any appropriate and compatible specification or standard.

In the FIG. 3 embodiment, a network interface 312 is preferably coupled to both I/O bus 314 and network bus 132 (FIG. 1) to serve as an interface for transferring isochronous data and asynchronous data between computer 116 and network 110. In addition, a node A 326(a) and a node B 326(b) are also coupled to I/O bus 314 via respective paths 350 and 354. In the FIG. 3 embodiment, node A 326(a) and/or node B 326(b) may be integral with computer 116, or, alternately, node A 326(a) and/or node B 326(b) may be external to computer 116. For purposes of illustration and clarity, the FIG. 3 computer 116 shows only two nodes 326, however, in alternate embodiments, computer 116 may include any number of input/output nodes 326.

Node A 326(a) and node B 326(b) preferably may include any desired type of interface, device, circuit, process, or node, including, for example, an ethernet interface, a printer device, a modem, or a graphics device. Furthermore, computer 116 may alternately be implemented as various other types of electronic devices including, for example, a set-top box or a digital television interface.

Computer 116 also includes a central processing unit (CPU) 320, a memory 322, and a CPU bus 318 that is isolated from I/0 bus 314 by an I/O bus bridge 316. In practice, various types of information and data are preferably transferred by computer 116 between memory 322 and I/O bus 314 via CPU bus 318 and I/O bus bridge 316.

In the FIG. 3 embodiment, I/O bus 314 may only be accessed by a single given I/O device (network interface 312, node A 326(a), or node B 326(b)) at any particular time to transfer information between memory 322 and the given I/O device. Therefore, in order to gain control of I/O bus 314 for a data transfer operation, network interface 312, node A 326(a), or node B 326(b) may request control of I/O bus 314 from I/O bus bridge 316. In certain embodiments, in accordance with an arbitration algorithm, an arbiter device (not shown) in I/O bus bridge 316 responsively may grant control of I/O bus 314 to the requesting I/O device.

For example, a requesting node 326 may send a request to I/O bus bridge 316, which responsively may issue a grant for control of I/O bus 314 to the requesting node 326. I/O bus bridge 316 preferably arbitrates conflicting requests from the I/O devices for control of I/O bus 314 with the use of any appropriate arbitration algorithm. For example, several possible arbitration algorithms may include a first come-first serve approach, an alternating round-robin technique, or a request prioritization method based on the importance or size of the data transfer.

Utilizing network interface 312 (or any other isochronous-capable I/O node) to transfer isochronous data over I/O bus 314 may create special requirements and consideration for obtaining timely control of I/O bus 314. Isochronous data typically is time-sensitive data which deterministically arrives at pre-determined timing intervals. Because of the time-sensitive nature of isochronous data, re-transmission of an isochronous data transfer may not be appropriate or possible. Obtaining timely access to I/O bus 314 thus becomes of heightened importance when network interface 312 requires control of I/O bus 314 to perform an isochronous data transfer.

For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming.

If network interface 312 is unable to gain timely access to I/O bus 314 due to conflicting bus traffic, then significant buffer memory resources (not shown) may be required to prevent loss of the isochronous data. However, providing additional buffer memory resources may have a negative economic impact on production costs of computer 116, and controlling the buffering operations may also consume valuable processing resources in computer 116. An effective method for ensuring successful and timely completion of isochronous data transfers without requiring excess buffer memory resources is further discussed below in conjunction with FIGS. 5 through 9, in accordance with the present invention.

Figure 4:
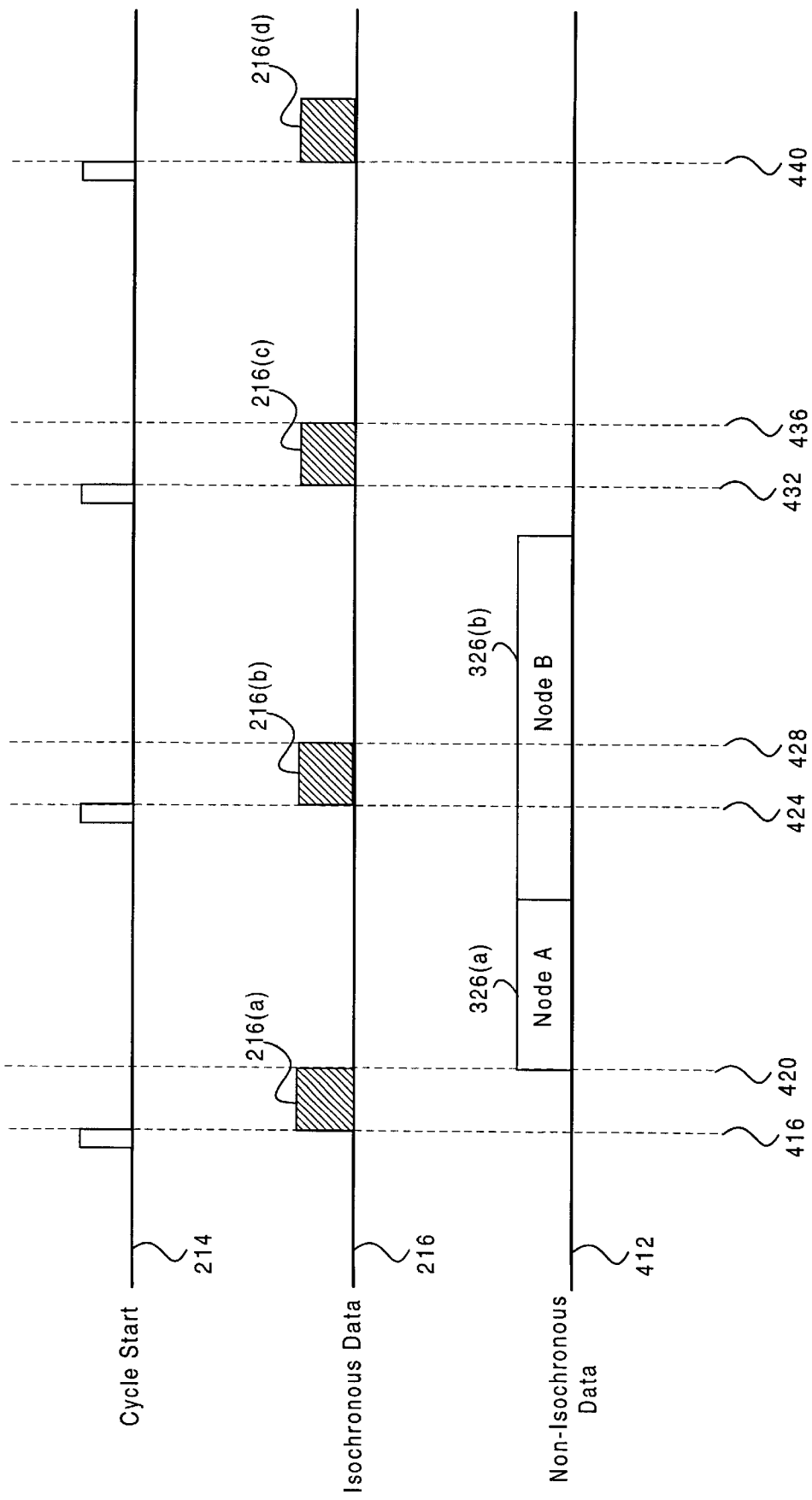
FIG. 4 is a timing diagram illustrating non-deterministic performance for the computer of FIG. 3.

Referring now to FIG. 4, a timing diagram to illustrate nondeterministic performance on I/O bus 314 of the FIG. 3 computer 116 is shown. The FIG. 4 timing diagram includes a cycle start signal 214, an isochronous data signal 216, and a non-isochronous data signal 412 The FIG. 4 timing diagram illustrates one exemplary sequence for the FIG. 3 computer 116. The FIG. 4 embodiment is presented for purposes of illustration only, and in alternate embodiments, the FIG. 3 computer 116 may readily function with various other waveforms and waveform timings in addition to, or instead of, those shown in the FIG. 4 embodiment.

In the FIG. 4 embodiment, an initial cycle start pulse 214 is immediately followed, at time 416, by a transmission of isochronous data 216(a) on I/O bus 314. Then, at time 420, the transmission of isochronous data 216(a) completes, and a transmission of node A data 326(a) begins. Immediately following the termination of the node A data 326(a), a transmission of node B data 326(b) commences.

At time 424, following a second cycle start pulse 214, a second transmission of isochronous data 216(b) is scheduled to occur. However, due to the pre-existing transmission of node B data 326(b) that is currently in progress, the second transmission of isochronous data 216(b) may be preempted because I/O bus 314 is already in use. As discussed above, in conjunction with FIG. 3, due to the time-sensitive nature of isochronous processes, the pre-emption of regularly-scheduled isochronous data transfers by pre-existing non-isochronous data transfers may lead to unacceptable performance in computer 116.

Figure 5:
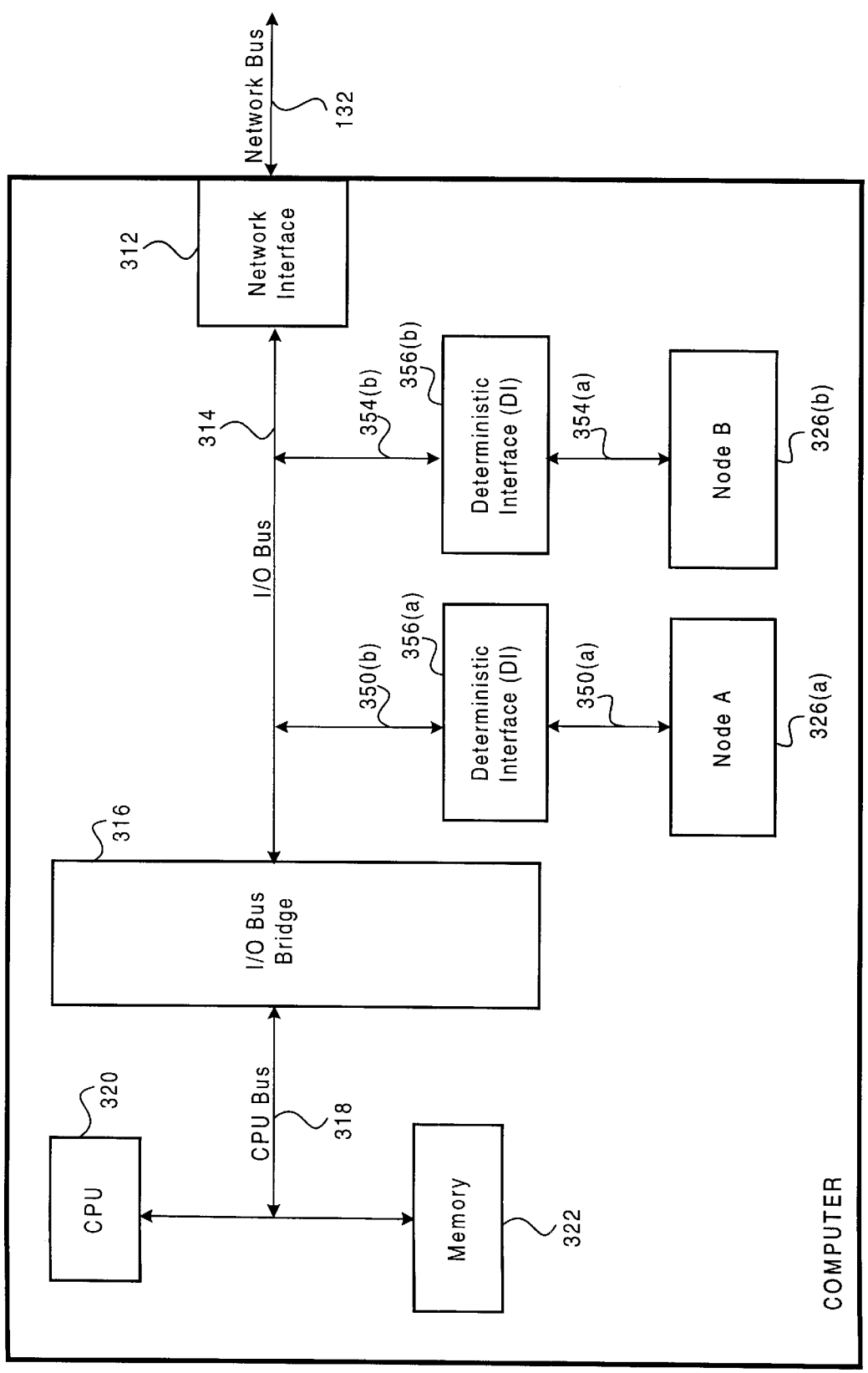
FIG. 5 is a block diagram for one embodiment of the computer of FIG. 1, in accordance with the present invention.

Referring now to FIG. 5, a block diagram for one embodiment of the FIG. 1 computer 116 is shown, in accordance with the present invention. In the FIG. 5 embodiment, computer 116 includes various components that correspond to identically-numbered and identically-named components from the FIG. 3 embodiment of computer 116. In the FIG. 3 and FIG. 5 embodiments, components with identical reference numbers and names preferably operate in the same or similar manner, as described above in conjunction with FIG. 3.

However, in certain other embodiments, the components of FIG. 5 may alternately function in a manner different than that described in the discussion of the FIG. 3 embodiment of computer 116. Furthermore, alternate embodiments of computer 116 may readily utilize various other configurations and architectures that those disclosed and discussed in conjunction with either FIG. 3 or FIG. 5.

The FIG. 5 embodiment includes several architectural design changes that are not present in the FIG. 3 embodiment. For example, unlike the FIG. 3 embodiment, the FIG. 5 embodiment includes a deterministic interface (DI) 356(a) that is interposed between node A 326(a) and I/O bus 314. Similarly, node B 326(b) of the FIG. 5 embodiment also communicates to I/O bus 314 through a deterministic interface (DI) 356(b). In accordance with certain embodiments of the present invention, the operation of deterministic interface 356(a) may be transparent to node A 326(a), and the operation of deterministic interface 356(b) may be transparent to node B 326(b).

In addition, one or more deterministic interfaces 356 may readily be added to the circuitry of computer 116 with only minimal changes to the basic system design. In certain embodiments, standard components and devices may therefore be utilized to economically and effectively implement computer 116. The operation and functionality of deterministic interfaces 356 are further discussed below in conjunction with FIGS. 6 through 9.

Figure 6:
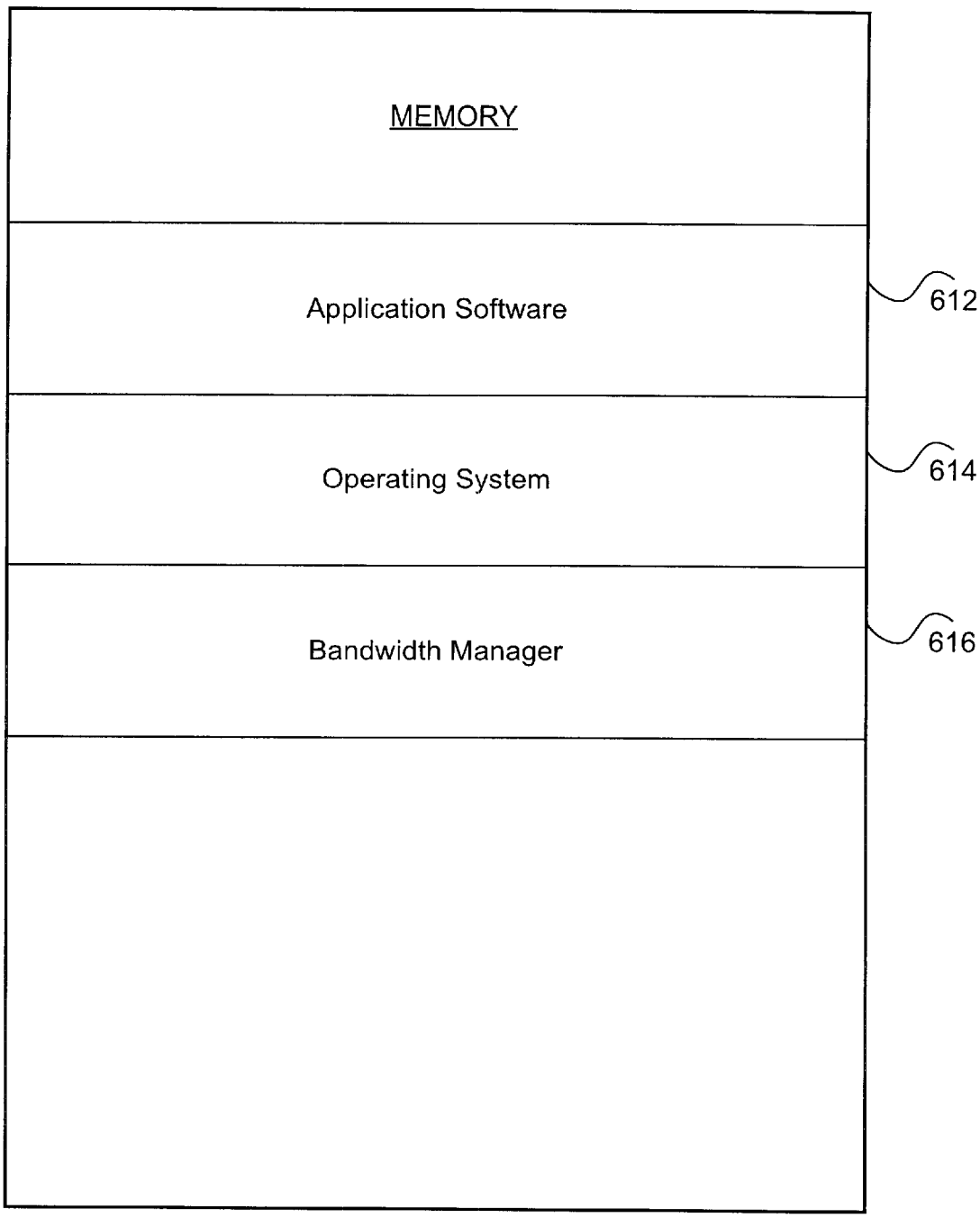
FIG. 6 is a block diagram for one embodiment of the memory of FIG. 5, in accordance with the present invention.

Referring now to FIG. 6, a block diagram for one embodiment of the FIG. 5 memory 322 is shown, in accordance with the present invention. In the FIG. 6 embodiment, memory 322 preferably includes, but is not limited to, application software 612, an operating system 614, and a bandwidth manager 316. In alternate embodiments, memory 322 may readily include various other components in addition to, or instead of, the components that are discussed in conjunction with the FIG. 6 embodiment.

In the FIG. 6 embodiment, application software 612 includes software instructions that are preferably executed by CPU 320 (FIG. 5) for performing various functions and operations by computer 116. The particular nature and functionality of application software 612 preferably varies depending upon factors such as the type and purpose of the corresponding host device 116.

In the FIG. 6 embodiment, operating system 614 preferably controls and coordinates low-level functionality of device 116. Bandwidth manager 616 preferably manages the scheduling and execution of various processes and functions for device 116. The functionality and operation of bandwidth manager 616 is further discussed below in conjunction with FIGS. 7 through 9.

Figure 7:
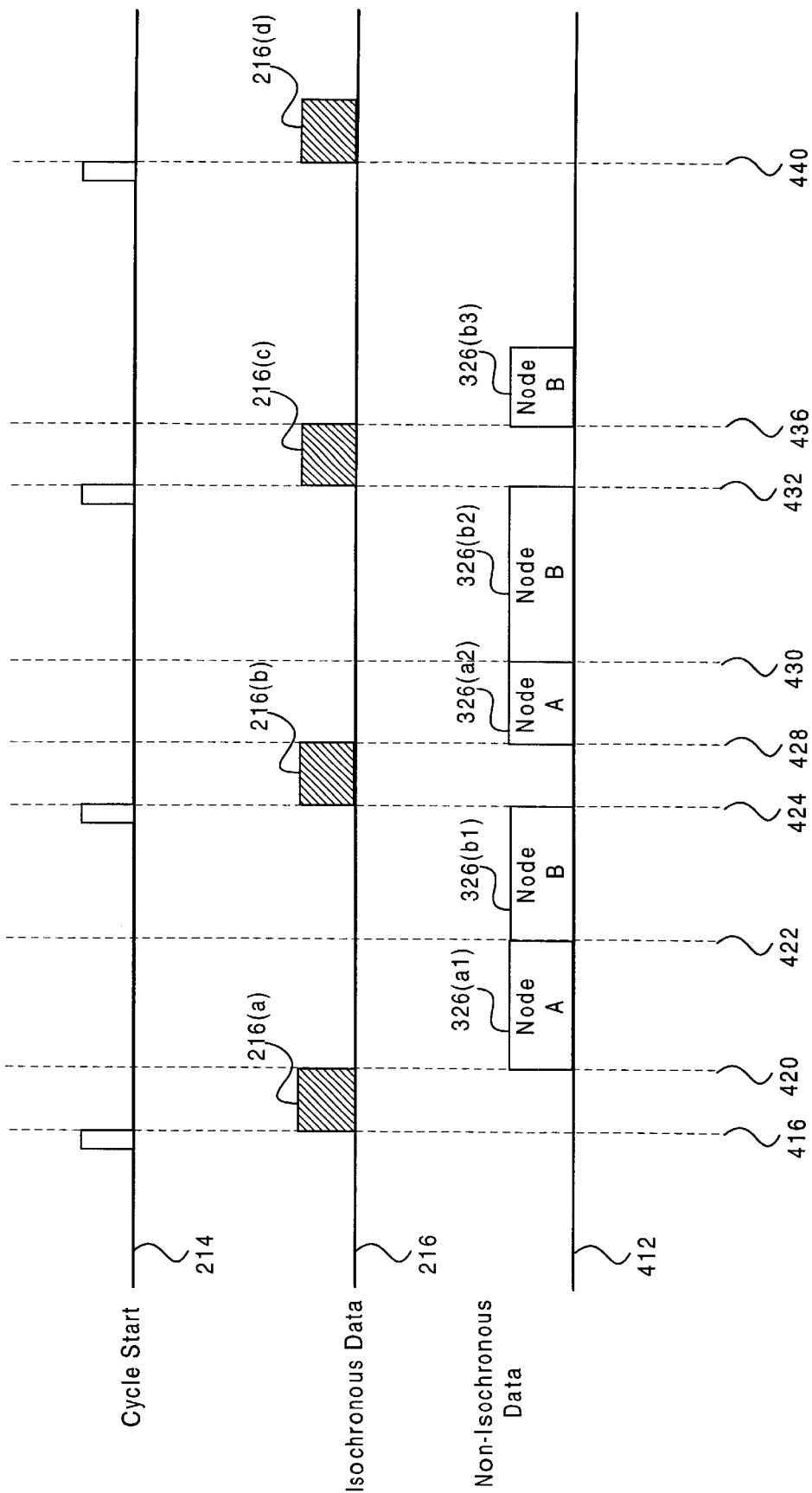
FIG. 7 is a timing diagram illustrating deterministic performance of the computer of FIG. 5, in accordance with one embodiment of the present invention.

Referring now to FIG. 7, a timing diagram to illustrate deterministic performance on I/O bus 314 of the FIG. 5 computer 116 is shown, in accordance with the present invention. The FIG. 7 embodiment includes a cycle start signal 214, an isochronous data signal 216, and a non-isochronous data signal 412. The FIG. 7 timing diagram depicts one exemplary sequence for the FIG. 5 computer 116, and is presented for purposes of illustration only. In alternate embodiments, the FIG. 5 computer 116 may readily function with various other waveforms and waveform timings in addition to, or instead of, those shown in the FIG. 7 embodiment.

The FIG. 7 timing diagram is intended to represent an improved manner for handling the data transfer sequence of FIG. 4, in accordance with the present invention. In the FIG. 7 embodiment, bandwidth manager 616 preferably individually analyzes the isochronous data 216 and the various non-isochronous data 412 to determine an effective manner for scheduling the respective data transfers.

In accordance with the present invention, bandwidth manager 616 preferably gives first priority to transfers of isochronous data 216. Therefore, bandwidth manager 616 preferably may limit the duration of any given non-isochronous data transfer 412 to ensure that a scheduled transmission of isochronous data 216 may occur in a timely manner. Bandwidth manager 616 may utilize any appropriate criteria or algorithms to determine how to effectively limit transfers of the various non-isochronous data 412.

For example, bandwidth manager 616 may limit each transfer of non-isochronous data by a pro rata amount that is dependent upon the relative size of the non-isochronous data 412, or bandwidth manager 616 may alternately reduce transfers of isochronous data 412 by differing amounts, depending upon factors such as the relative importance of the transfer. In certain embodiments, bandwidth manager 616 may ensure that at least a portion of each transfer of non-isochronous data 412 is permitted to access I/O bus 314 during a given isochronous cycle.

In the FIG. 7 embodiment, an initial cycle start pulse 214 is immediately followed, at time 416, by a transmission of isochronous data 216(a) on I/O bus 314. Then, at time 420, the transmission of isochronous data 216(a) completes, and a partial transmission of node A data 326(a1) begins. At time 422, bandwidth manager 616 preferably interrupts the transmission of node A data 326(a1) to allow a partial transmission of node B data 326(b1).

At time 424, following a second cycle start pulse 214, bandwidth manager 616 preferably interrupts the transmission of node B data 326(b1) to permit the transmission of isochronous data 216(b). Then, at time 428, the transmission of isochronous data 216(b) completes, and a transmission of interrupted node A data 326(a2) recommences. At time 430, the transmission of node A data 326(a2) completes, and transmission of interrupted node B data 326(b2) recommences.

At time 432, following a third cycle start pulse 214, bandwidth manager 616 preferably interrupts the transmission of node B data 326(b2) to permit the transmission of isochronous data 216(c). Then, at time 436, the transmission of isochronous data 216(c) completes, and interrupted transmission of node B data 326(b3) completes. Bandwidth manager 616 thus facilitates the timely transfer of isochronous data 216, in accordance with the present invention.

Figure 8:
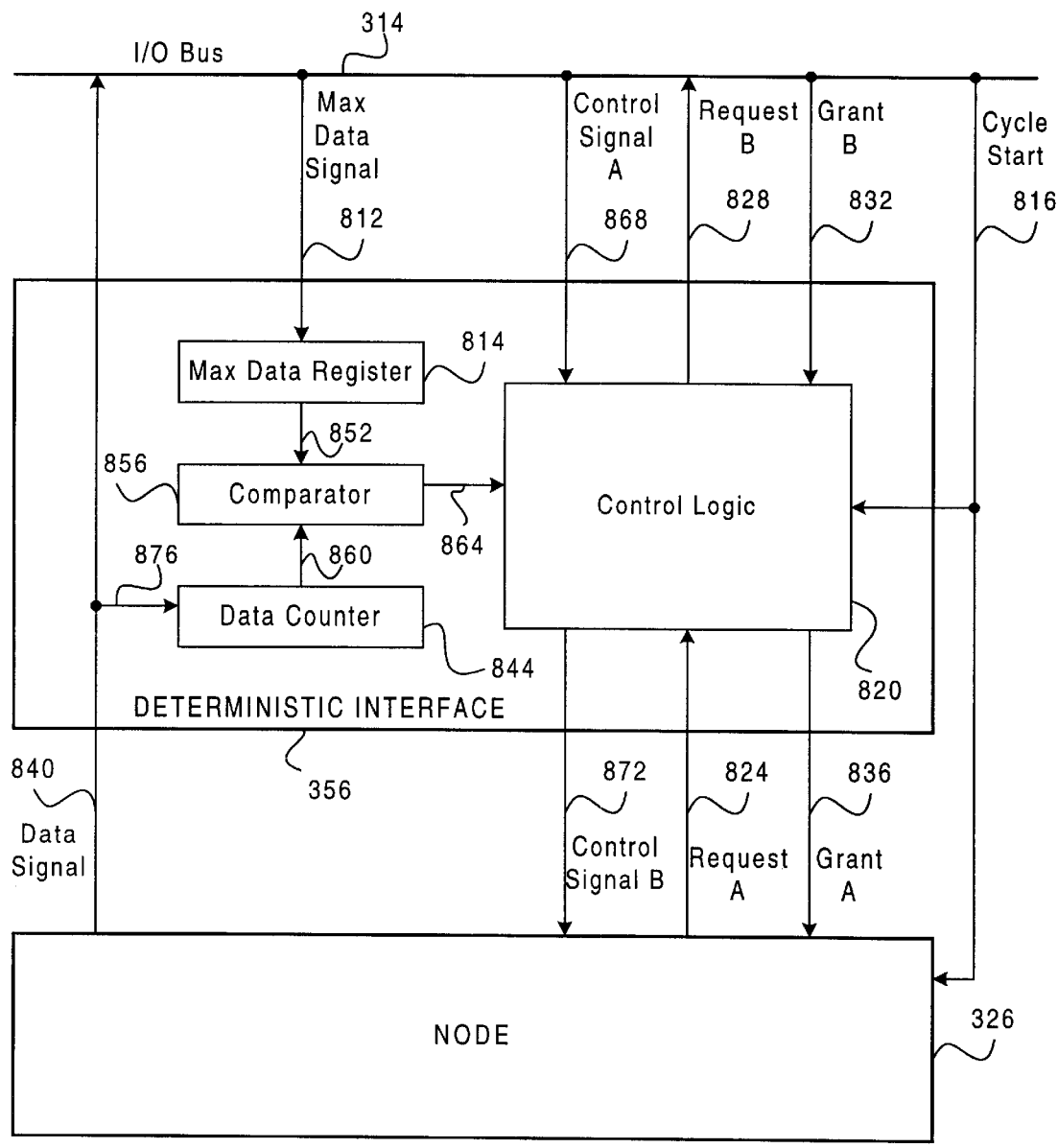
FIG. 8 is a block diagram for one embodiment of the deterministic interface of FIG. 5, in accordance with the present invention.

Referring now to FIG. 8, a block diagram for one embodiment of the FIG. 5 deterministic interface (DI) 356 is shown, in accordance with the present invention. In the FIG. 8 embodiment, deterministic interface 356 preferably includes, but is not limited to, a maximum-data register (max data register) 814, a comparator 856, a data counter 844, and control logic 820. The FIG. 8 embodiment is presented for purposes of discussion, however, deterministic interface 356 may alternately be configured using any other appropriate and compatible implementation.

In the FIG. 8 embodiment, as discussed above in conjunction with FIG. 7, initially, bandwidth manager 616 preferably programs max data register 814 via path 812 with a maximum data value that equals the number of data units that node 326 may transfer onto I/O bus 314 in a given isochronous cycle. The foregoing data units may be any desired increment of data size. For example, a data unit may alternately be a single bit, a single byte, a data packet, a data block, or any other such data unit.

Next, a cycle start signal is preferably provided via path 816 to control logic 820 in DI 356, and to node 326 to thereby indicate the beginning of the next isochronous cycle. Assuming that node 326 has non-isochronous data to transfer onto I/O bus 314, then, node 326 preferably next issues a request A for control of I/O bus 314 to control logic 820 via path 824. In response, control logic preferably may then issue a request B to I/O bus bridge 316 via path 828 and I/O bus 314. Subject to appropriate arbitration rules and current conditions in node 326, I/O bus bridge 316 may then return a grant B to control logic 820 via I/O bus 314 and path 832. Control logic 820 may then preferably issue a grant A to node 326 via path 836 to thereby grant control of I/O bus 314 to node 326.

In response, node 326 preferably may then begin a non-isochronous data transmission (data signal) onto I/O bus 314 via path 840. Data counter 844 also preferably may monitor the foregoing non-isochronous data transmission via path 876 to increment a data count value by a value of one for each data unit in the non-isochronous data transmission.

In accordance with the present invention, comparator 856 may obtain the maximum data value from max data register 814 via path 852. In addition, comparator 856 may monitor the data count value from data counter 844 via path 860. When the data count value equals the maximum data value, then comparator 856 preferably may generate a transfer limit signal to control logic 820 via path 864.

In response, control logic 820 preferably transmits a control signal B to node 326 via path 872 to thereby command node 326 to interrupt the non-isochronous data transfer that is currently in progress, de-assert request A on path 824, and release control of I/O bus 314. Control logic 820 preferably may also de-assert the grant A signal to node 326 on path 836. In certain embodiments, node 326 preferably may include the capability to store the transfer interruption point at which the non-isochronous data transfer was stopped, so that the non-isochronous data transfer may be resumed at the transfer interruption point at a later time.

After the next cycle start signal on path 816, node 326 may then reassert request A to control logic 820 via path 824, and, when appropriate, control logic 820 may responsively return a grant A signal to node 326 via path 836 to thereby permit node 326 to resume the interrupted non-isochronous data transfer (which still may remain limited by the maximum data value in max data register 814).

Figure 9:
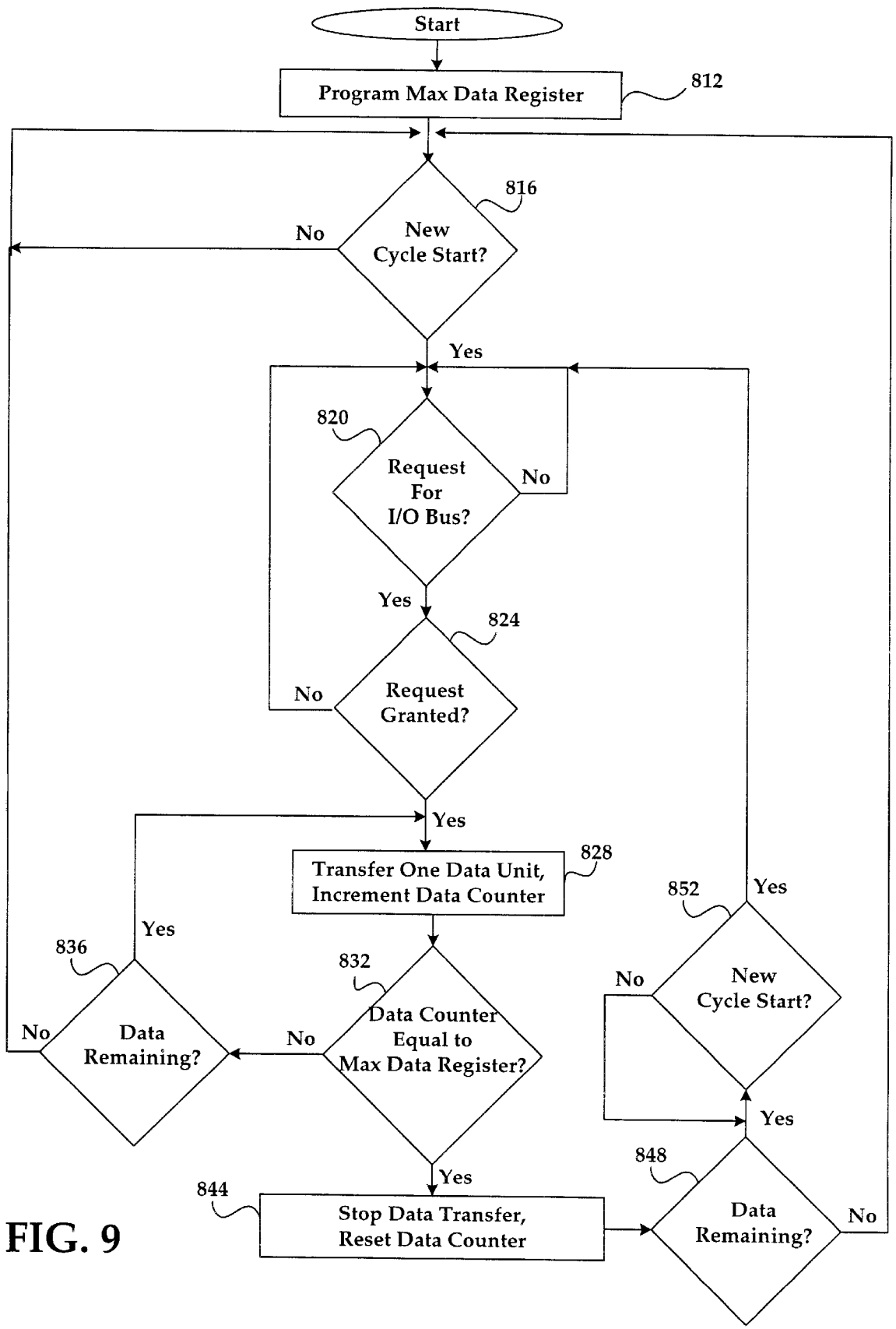
FIG. 9 is a flowchart of method steps for providing deterministic performance from a non-deterministic device, in accordance with one embodiment of the present invention.

Referring now to FIG. 9, a flowchart of method steps for providing deterministic performance from a non-deterministic device 116 is shown, in accordance with one embodiment of the present invention. In alternate embodiments, the present invention may similarly utilize various other steps in differing sequences to provide deterministic performance from a non-deterministic device 116, in accordance with the present invention.

In the FIG. 9 embodiment, initially, in step 812, bandwidth manager 616 preferably programs max data register 814 with a maximum data value. Then, in step 816, device 116 preferably waits for a new cycle start signal to indicate the beginning of the next isochronous cycle. In step 820, after a new cycle start occurs, then device 116 preferably waits for a request for control of I/O bus 314 from a particular node 326.

In step 824, after a request for I/O bus 314 occurs, then the requesting node 326 preferably waits to receive a grant signal from I/O bus bridge 316 to authorize control of I/O bus 314 by node 326. In step 828, after a grant signal is received, then node 326 preferably transfers one data unit through deterministic interface 356 onto I/O bus 314. In step 832, comparator 856 preferably determines whether the current data count value in data counter 844 is equal to the maximum data value in max data register 814, and data counter 844 also preferably increments itself by a value of one to produce a current data count value.

If the current data count value in data counter 844 is not equal to the maximum data value in max data register 814, then, in step 836, node 326 determines whether untransferred data remains in the current non-isochronous data transfer. If no untransferred data remains, then the FIG. 9 process returns to step 816 to wait for a new cycle start signal. However, if untransferred data remains, then the FIG. 9 process then preferably returns to step 828 to transfer another data unit.

In foregoing step 832, if the current data count value in data counter 844 is equal to the maximum data value in max data register 814, then, in step 844, control logic 820 preferably commands node 326 to interrupt the current non-isochronous data transfer, and deterministic interface 356 preferably resets the data count value in data counter 844 to equal a value of zero.

Next, in step 848, node 326 determines whether untransferred data remains in the current non-isochronous data transfer. If untransferred data remains, then, in step 852, the FIG. 9 process preferably waits for a new cycle start signal to indicate the beginning of the next isochronous cycle. After a new cycle start occurs, the FIG. 9 process preferably returns to step 820 to request access to continue the transfer onto I/O bus 314. However, if no untransferred data remains, then the current non-isochronous data transfer is complete, and the FIG. 9 process returns to step 816 to process another non-isochronous data transfer, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for effectively providing a deterministic performance, comprising:
   a node configured to perform a data transfer operation;
   a deterministic interface coupled to said node for limiting said data transfer operation; and
   a bandwidth manager configured to control said deterministic interface to thereby provide said deterministic performance, said bandwidth manager programming a maximum data register with a maximum data value to indicate a maximum number of transferable data units per an isochronous cycle for said data transfer operation, said bandwidth manager evaluating and limiting said data transfer operation to ensure timely execution of an isochronous data transfer.

2. The system of claim 1 wherein said deterministic interface limits said data transfer operation to allow a time-sensitive isochronous process to execute.

3. The system of claim 1 wherein said node and said deterministic interface are coupled to one of a computer device, a set-top box, a digital television device, and a consumer electronic device.

4. The system of claim 1 wherein said node includes an input/output device that may be implemented as one of a printer device, an ethernet interface, a graphics device, or a modem.

5. The system of claim 1 wherein said node performs said data transfer operation over an input/output bus that is implemented according to a Peripheral Component Interconnect standard.

6. The system of claim 5 wherein a network interface is coupled between said input/output bus and a network bus which is implemented according to an IEEE 1394 serial bus interconnectivity standard.

7. The system of claim 5 further comprising a plurality of nodes that are coupled to said input/output bus, said bandwidth manager limiting respective data transfer operations from each of said plurality of nodes to thereby permit each of said plurality of nodes to complete at least a portion of said respective data transfer operations per an isochronous cycle.

8. The system of claim 1 wherein said deterministic interface is transparent to said node and an input/output bus.

9. The system of claim 1 wherein said deterministic interface is added to a computer device that is implemented with standardized electronic components without altering a basic system architecture of said computer device.

10. A system for effectively providing a deterministic performance, comprising:
    a node configured to perform a data transfer operation, said node performing said data transfer operation over an input/output bus that is implemented according to a Peripheral Component Interconnect standard;
    a deterministic interface coupled to said node for limiting said data transfer operation; and
    a bandwidth manager configured to control said deterministic interface to thereby provide said deterministic performance, said bandwidth manager programming a maximum data register with a maximum data value to indicate a maximum number of transferable data units per an isochronous cycle for said data transfer operation, said bandwidth manager evaluating and limiting said data transfer operation to ensure timely execution of an isochronous data transfer.

11. The system of claim 10 wherein an initial cycle start pulse occurs to indicate the beginning of a next isochronous cycle.

12. The system of claim 11 wherein said node transmits a request signal after said initial cycle start pulse to a bus bridge, said bus bridge responsively performing an arbitration procedure to return a grant signal to said node to thereby authorize access to said input/output bus.

13. The system of claim 12 wherein said node begins said data transfer operation to said input/output bus in response to said grant signal from said input/output bus bridge.

14. The system of claim 13 wherein a data counter in said deterministic interface monitors said data transfer operation, and increments a data count value by a value of one for each data unit in said data transfer operation.

15. The system of claim 14 wherein a comparator in said deterministic interface compares said maximum data value in said maximum data register to said data count value in said data counter, and generates a transfer limit signal to control logic in said deterministic interface whenever said maximum data value equals said data count value.

16. The system of claim 15 wherein said control logic issues a control signal to said node to interrupt said data transfer operation in response to said transfer limit signal.

17. The system of claim 16 wherein said node interrupts said data transfer operation in response to said control signal, said node storing a transfer interruption point for use in subsequently resuming said data transfer operation.

18. The system of claim 17 wherein said deterministic interface resets said data count value in said data counter to equal a value of zero whenever said control logic issues said control signal to said node.

19. The system of claim 18 wherein said node de-asserts said request signal, and said deterministic interface de-asserts said grant signal whenever said control logic issues said control signal to said node.

20. The system of claim 19 wherein said node re-asserts said request signal in response to a next isochronous cycle start pulse, said deterministic interface responsively re-asserting said grant signal, thereby authorizing said node to recommence said data transfer operation at said transfer interruption point.

21. A method for effectively providing a deterministic performance, comprising the steps of:
    performing a data transfer operation with a node;
    limiting said data transfer operation with a deterministic interface; and
    controlling said deterministic interface with a bandwidth manager to thereby provide said deterministic performance, said bandwidth manager programming a maximum data register with a maximum data value to indicate a maximum number of transferable data units per an isochronous cycle for said data transfer operation, said bandwidth manager evaluating and limiting said data transfer operation to ensure timely execution of an isochronous data transfer.

22. The method of claim 21 wherein said deterministic interface limits said data transfer operation to allow a time-sensitive isochronous process to execute.

23. The method of claim 21 wherein said node and said deterministic interface are coupled to one of a computer device, a set-top box, a digital television device, and a consumer electronic device.

24. The method of claim 21 wherein said node includes an input/output device that may be implemented as one of a printer device, an ethernet interface, a graphics device, or a modem.

25. The method of claim 21 wherein said node performs said data transfer operation over an input/output bus that is implemented according to a Peripheral Component Interconnect standard.

26. The method of claim 25 wherein a network interface is coupled between said input/output bus and a network bus which is implemented according to an IEEE 1394 serial bus interconnectivity standard.

27. The method of claim 25 further comprising a plurality of nodes that are coupled to said input/output bus, said bandwidth manager limiting respective data transfer operations from each of said plurality of nodes to thereby permit each of said plurality of nodes to complete at least a portion of said respective data transfer operations per an isochronous cycle.

28. The method of claim 21 wherein said deterministic interface is transparent to said node and an input/output bus.

29. The method of claim 21 wherein said deterministic interface is added to a computer device that is implemented with standardized electronic components without altering a basic system architecture of said computer device.

30. A method for effectively providing a deterministic performance, comprising the steps of:
    performing a data transfer operation with a node, said node performing said data transfer operation over an input/output bus that is implemented according to a Peripheral Component Interconnect standard;
    limiting said data transfer operation with a deterministic interface; and controlling said deterministic interface with a bandwidth manager to thereby provide said deterministic performance, said bandwidth manager programming a maximum data register with a maximum data value to indicate a maximum number of transferable data units per an isochronous cycle for said data transfer operation, said bandwidth manager evaluating and limiting said data transfer operation to ensure timely execution of an isochronous data transfer.

31. The method of claim 30 wherein an initial cycle start pulse occurs to indicate the beginning of a next isochronous cycle.

32. The method of claim 31 wherein said node transmits a request signal after said initial cycle start pulse to a bus bridge, said bus bridge responsively performing an arbitration procedure to return a grant signal to said node to thereby authorize access to said input/output bus.

33. The method of claim 32 wherein said node begins said data transfer operation to said input/output bus in response to said grant signal from said input/output bus bridge.

34. The method of claim 33 wherein a data counter in said deterministic interface monitors said data transfer operation, and increments a data count value by a value of one for each data unit in said data transfer operation.

35. The method of claim 34 wherein a comparator in said deterministic interface compares said maximum data value in said maximum data register to said data count value in said data counter, and generates a transfer limit signal to control logic in said deterministic interface whenever said maximum data value equals said data count value.

36. The method of claim 35 wherein said control logic issues a control signal to said node to interrupt said data transfer operation in response to said transfer limit signal.

37. The method of claim 36 wherein said node interrupts said data transfer operation in response to said control signal, said node storing a transfer interruption point for use in subsequently resuming said data transfer operation.

38. The method of claim 37 wherein said deterministic interface resets said data count value in said data counter to equal a value of zero whenever said control logic issues said control signal to said node.

39. The method of claim 38 wherein said node de-asserts said request signal, and said deterministic interface de-asserts said grant signal whenever said control logic issues said control signal to said node.

40. The method of claim 39 wherein said node re-asserts said request signal in response to a next isochronous cycle start pulse, said deterministic interface responsively re-asserting said grant signal, thereby authorizing said node to recommence said data transfer operation at said transfer interruption point.

41. A method for effectively providing a deterministic performance, comprising the steps of:

performing a data transfer operation with a node;

limiting said data transfer operation with a deterministic interface; and controlling said deterministic interface with a bandwidth manager to thereby provide said deterministic performance, said bandwidth manager programming said deterministic interface with a maximum data value that is selected to remove bus control conflicts for an input/output bus to thereby successfully execute deterministically-scheduled isochronous data transfers, said deterministic interface interrupting said data transfer operation from said node when a transferred data-unit total of said data transfer operation equals said maximum data value, said node then attempting to complete said data transfer operation in subsequent isochronous cycles.

42. A system for effectively providing deterministic performance, comprising:

means for performing a data transfer operation;

means for limiting said data transfer operation; and means for controlling said means for limiting to thereby provide said deterministic performance.

43. A computer-readable medium comprising program instructions for providing a deterministic performance by performing the steps of:

beginning a data transfer operation with a node;

limiting said data transfer operation with a deterministic interface; and controlling said deterministic interface with a bandwidth manager to thereby provide said deterministic performance, said bandwidth manager programming a maximum data register with a maximum data value to indicate a maximum number of transferable data units per an isochronous cycle for said data transfer operation, said bandwidth manager evaluating and limiting said data transfer operation to ensure timely execution of an isochronous data transfer.

* * * * *